Oct. 31, 1939.  C. G. KUMMERLANDER  2,178,207

EXTRACTING MEANS

Filed Aug. 16, 1938  2 Sheets-Sheet 2

Charles G. Kummerlander
INVENTOR.

BY Clarence E. Threedy
HIS ATTORNEY.

Patented Oct. 31, 1939

2,178,207

UNITED STATES PATENT OFFICE 2,178,207

EXTRACTING MEANS

Charles G. Kummerlander, Chicago, Ill.

Application August 16, 1938, Serial No. 225,116

2 Claims. (Cl. 87—28)

This invention relates to improvements in the art of making extracts for use with food products, beverages, and the like, one of the principal objects being the provision of a process for extracting essential flavoring ingredients from various substances including grains, herbs, and the like, the process further providing for the concentration of the extract in a carrier or vehicle which is in turn to be mixed or joined with the ultimate product.

Viewed from another aspect, it is an important object of the invention to provide a process for the extraction of certain desirable volatile flavoring essences and reconcentrating the extract back into the extract base, the process lending itself perfectly to positive control and avoiding the waste of certain desirable and relatively volatile essences.

Another object is the provision of a process for procuring extracts wherein volatile extract essences are simultaneously and repeatedly distilled and condensed in the same vessel, with or without a carrier into which the extract is reconcentrated.

Another object is the provision of extract apparatus of general application and especially suited for employment with the aforesaid process.

Still another and more specific object is the provision of apparatus for use in producing distillate extracts and for concentrating such extracts into a carrier which may be further processed or which may be suitable for immediate use, said apparatus including a member providing upper and lower chambers, the lower chamber constituting a retort, heating means within the retort, and the upper chamber providing a self-contained condensing unit of novel arrangement and operation all of which will hereinafter be set forth in detail as the following description proceeds in view of the annexed drawings, in which:

The process and apparatus of my invention is of general application to the art of preparing extracts and is especially applicable to the brewing and beverage industries, and makes possible the procuring of extracts of essential flavoring ingredients useful in the preparation of high-grade beers and many beverages of the non-alcoholic variety, whereby delicate aromas and flavoring essences are safely brought out for infusion through the agency of a suitable carrier into a mash wort or brew.

The process contemplates the use of what is termed for convenience an extract base, that is to say, a substance, for example hops, from which certain aromatic and essential substances are to be reclaimed, and a carrier usually in the nature of a liquid or near liquid mash or wort into which the base or hops has been mixed.

The mixture of the carrier with the extract base constitutes a charge, the carrier, it being pointed out, desirably being of a nature which makes it suitable for incorporation in the ultimate product in which the extracted essences are to be redistributed or concentrated.

The charge or mixture of the extract base and carrier is then subjected to a digesting process in a closed vessel or retort, heat being applied in some suitable manner to the charge so that the digesting process may be carried forward to drive off the volatile essential ingredients in the extract base. This digesting process is in the nature of a distillation, one difference being that the distillate, according to the present invention, is continuously and repeatedly returned and reconcentrated in the charge.

The digesting stage of the process is carefully controlled with regard to the temperature of the charge or mixture of the base and carrier, different critical temperatures being required, depending upon the nature of the extract base and the particular essences which are to be extracted.

Since the process may be used with a wide variety of substances, for example grains such as hops, rye, and the like, or with a great variety of herbs, for example ginger roots and the like, and since there are a variety of essential oils and ingredients in these various substances which it may or may not be desirable to bring out, the critical operating conditions with regard to such factors as the distilling or digesting temperature, the specific gravity of the carriers, and temperatures in cooling stages where the latter are employed, must be determined by the brewmaster or extract operator, depending upon the particular requirements of each case.

Specific examples of the application of the aforesaid extracting and concentrating process will be referred to hereinafter in conjunction with the description and operation of apparatus for carrying out the process.

Figure 1:
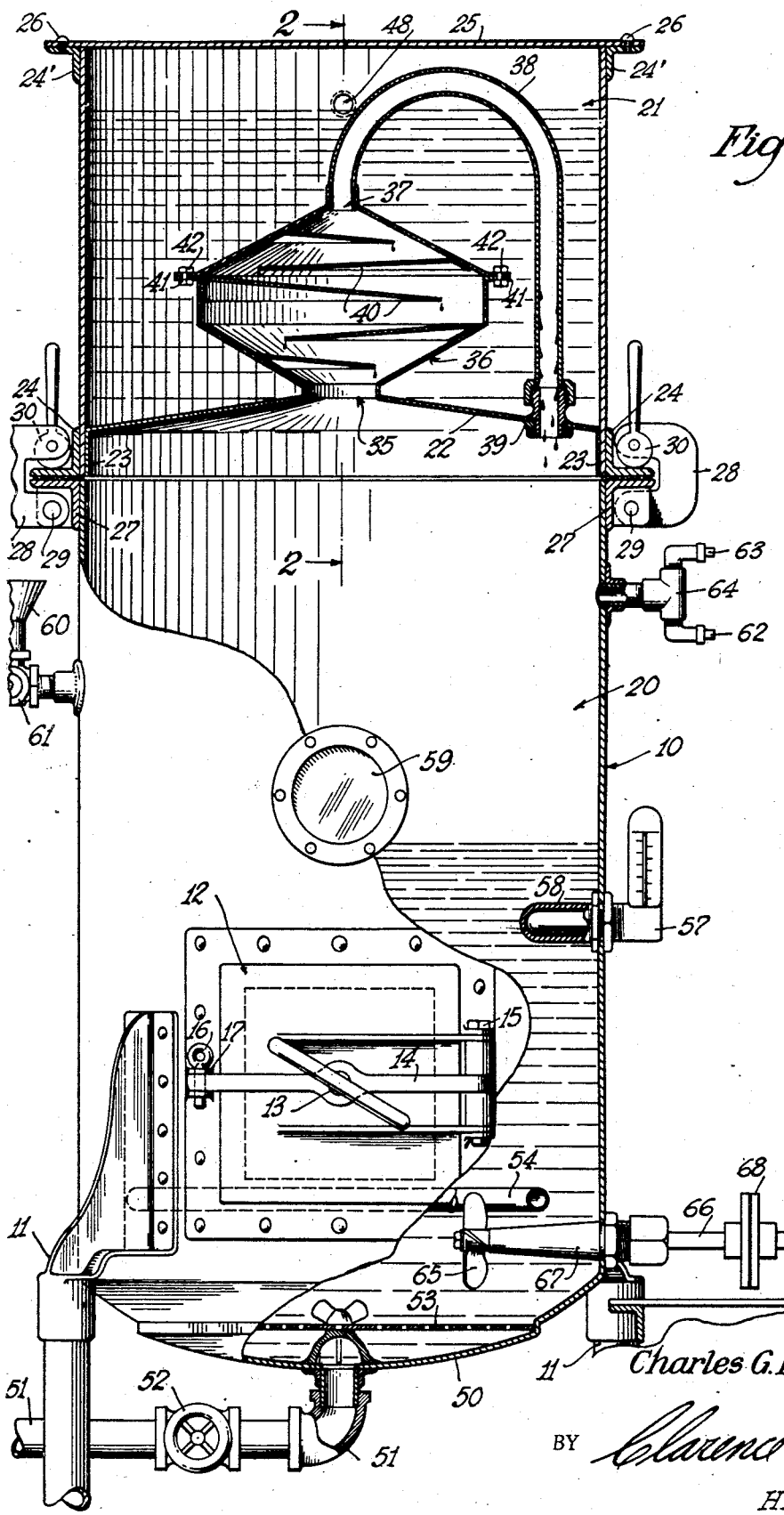
Fig. 1 is a front elevational view partly in section of a preferred embodiment of the extractor.

In Fig. 1, there is illustrated a preferred embodiment of apparatus for carrying out my process, such apparatus including a vessel 10 in the nature of a tank mounted in upright position by means such as the legs 11 attached to its lower region, the tank having a charging closure or gate 12 arranged on a side thereof just above the bottom, the gate or closure being provided with suitable sealing means in the nature of a screw clamp 13 threadably mounted in a bar 14 which is mounted on the same pintle 15 which mounts the closure; the opposite end of the bar 14 is secured by pin means 16 in a yoke 17 so that the screw clamp 13 may be turned up to wedge the door into firmly closed condition.

The vessel 10 constitutes a unit which is divided into a lower chamber 20 constituting a retort, and a separate upper chamber 21 constituting a condenser housing.

The upper wall 22 of the retort is preferably of concavo-convex form, being concave inwardly of the retort and convex inwardly of the condenser housing and also constitutes a bottom wall or floor for the latter.

The extracting unit is preferably, though not necessarily, formed in separable parts, that is, a lower part providing the retort 20 and an upper part providing the condenser housing 21, the retort being open at its upper end, and the concavo-convex bottom of the housing 21 being joined in the region 23, as by welding or the like, to the inner periphery of the upper housing part. The outer peripheral extremities of the housing 21 are provided with circumferential flange means 24 and 24', there being a top 25 attached by means of screws or rivets 26 to the upper flange portions 24'.

The outer peripheral extremities of the upper end of the retort are provided with flange means 27 similar to the flanges 24 and positioned to confront the latter when the upper and lower sections are in assembled relation, there being cam clamps 28 pivotally mounted as at 29 on the flange parts 27 and having manually operable locking cams 30 arranged to be clamped against the confronting flange parts 24 so that the upper section or housing 21 is rigidly secured in operative relation on top of the retort 20.

The retort 20 communicates through a small opening 35 in the center of the floor 22 with a condensing chamber 36 having a smaller outlet 37 at its upper end and connected by means of a reentrantly curved conduit 38, preferably of smaller cross section than the throat opening 35, and communicating back into the retort at its lower end through a nipple 39. Baffles 40 are arranged within the condensing chamber in the customary manner, and the chamber is constructed preferably in separable upper and lower sections joined along confronting rim portions 41 (Fig. 2 also) by means such as the bolts 42.

Figure 2:
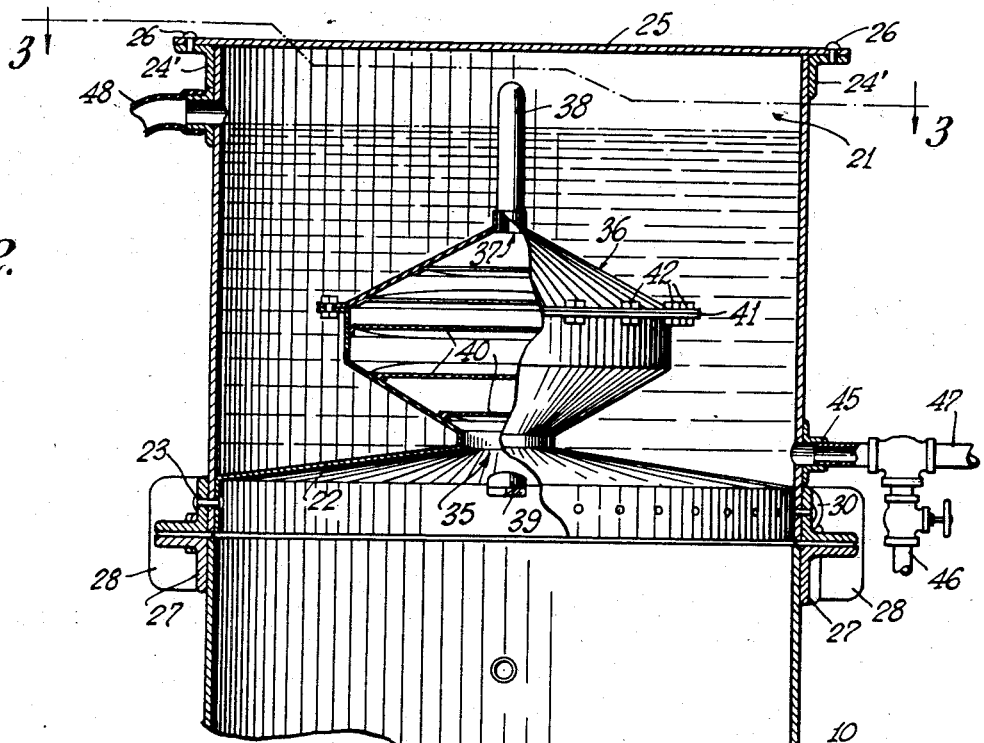
Fig. 2 is a fragmentary vertical section taken along line 2—2 of Fig. 1.

As shown in Fig. 2, the condenser housing 21 is provided with a cold water inlet 45 including a drain valve 46, condensing water being led in through a feed pipe connection 47 and circulated through the upper chamber portion 21 and out a discharge pipe 48 in the upper level thereof, the cooling water circulating also over the surfaces of the condensing chamber 36 and the floor 22 as well as about the feed-back conduit means 38.

The retort 20 is provided in its bottom 50 (Fig. 1) with a drain pipe 51 including a valve 52 and leading to any utilization source for the extract concentrate which is to be drained from the retort, there being a suitable strainer grating 53 arranged above the mouth of the discharge pipe 51.

Figure 3:
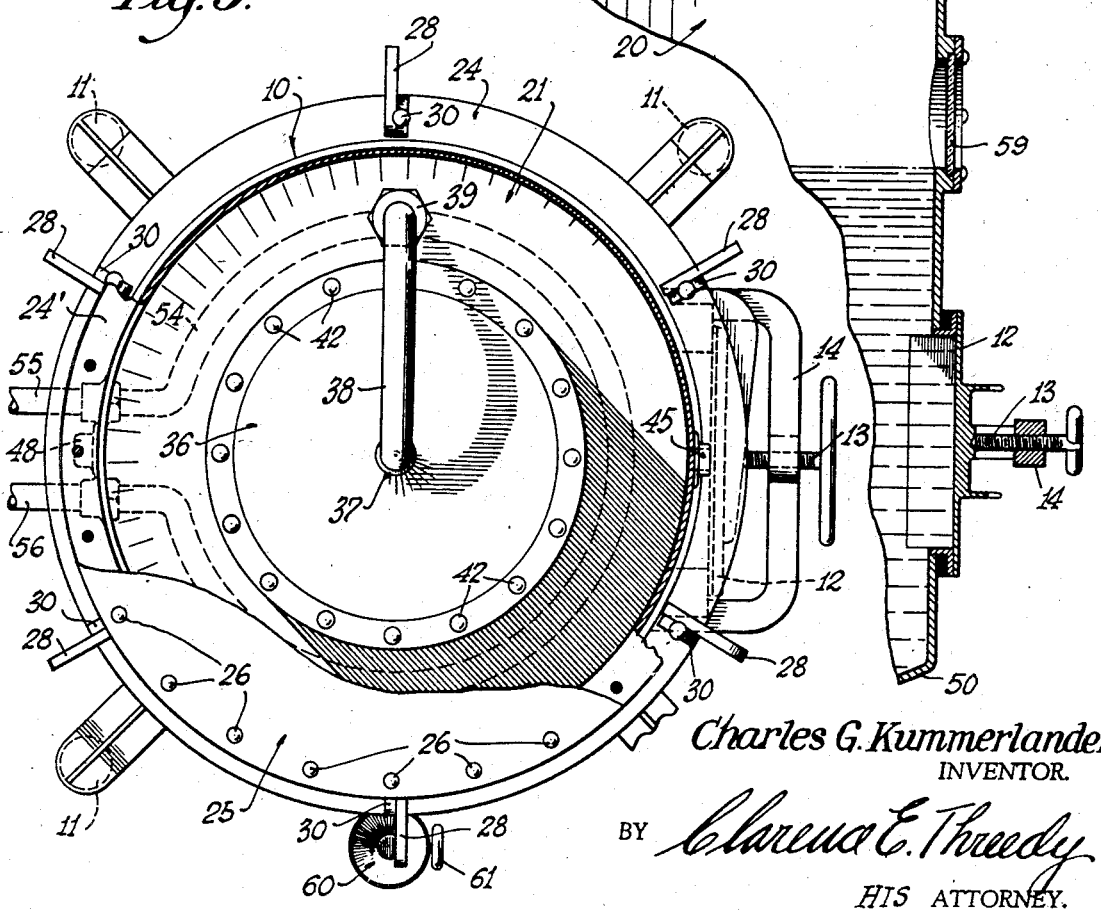
Fig. 3 is a horizontal section taken along the irregular line 3—3 of Fig. 2.

Arranged interiorly of the retort and preferably in spaced relation to the bottom thereof is a heating means preferably in the form of a coil steam line 54 having inlet and outlet connections 55 and 56 (Fig. 3) for connection with a source of live steam under suitable control for regulation of the temperatures within the retort, the temperature of the charge therein being regulated automatically through a suitable thermostatic control or manually by reference to a thermometer 57 conveniently mounted on the unit and having a heat exchange well 58 extended into the retort for contact with the upper body of the charge.

Arranged slightly above the normal level of the charge in the retort is a sight opening or observation window 59. Means for introducing fluid constituents of the charge or a fluid carrier, includes a funnel intake 60 provided with valve means 61 and communicating into the retort well above a normal level of the charge, there being safety valve means including a blow-off valve 62 and a vacuum intake valve 63 connected by means of a T 64 into the retort at a still higher level so that excessive internal and external pressures may be relieved automatically, it being contemplated that the extract concentrate or digested charge may be cooled with varying degrees of rapidity depending upon the circumstances of each case, either by shutting off the steam or heat source and relying upon the cooling effect of the water in the condenser housing or, in certain installations, by shunting cooling water through the steam coils by employing suitable change-over valves.

Means for agitating the charge during its treatment in the retort includes a small agitating blade or propeller 65 mounted on a shaft 66 which extends through a sleeve 67 from a driving connection 68 with a motor 69 or other driving means, the arrangement being such that the charge may be agitated at a desired rate where such treatment is indicated.

As one example of the use of the aforesaid extracting apparatus in conjunction with my process, it may be assumed that the condenser housing 21 is connected through the intake 45 with a suitable source of cooling water. A desired extract base, for example hops, essences of which are to be incorporated in a brew such as beer, for example, is introduced into the retort through the closure means 12 and thereafter a suitable liquid carrier, for example a malt wort, is introduced through the funnel intake 60 in proportions suitable to the requirements of the particular brew with respect to the desired flavoring essences which are to be reclaimed and concentrated, as well as the kind, quality, and quantity of hops, and other variable factors involved.

When a suitable charge is thus introduced into the retort, the digesting and extracting process is started by passing steam through the heating means 54, the various volatile aromatics and essences contained in the hops escaping from the charge and rising against the cooled surfaces of the partition wall 22 where certain of the more readily condensable ingredients will condense and drop back into the charge, while other volatile essences will pass through the throat 35 into the condenser 36 for condensation therein and gravitating movement back through the throat 35 into the body of the charge. Such distillates and extracts as are not readily condensed in the chamber 36 will pass through the relatively constricted feed-back pipe 38 where, due to the increased pressure and lower temperature (relative to the chamber 36), the products of higher volatility will condense and pass down into the main charge.

The foregoing distillation and reconcentration of the extracts is continued until the charge has been worked long enough to produce the desired extract concentration in the carrier, in this instance the malt wort. During the foregoing process, the agitating means 65 may be employed so as to get rapid, uniform distribution of the heat throughout the mass of the charge. When the extracting process has been continued to the desired degree the heating means is disconnected and the concentrate allowed to cool with a requisite degree of rapidity controlled through regulation of the water supply in the condenser housing and/or through the circulation of cooling water shunted through the steam coils. The resulting extract concentrate, including the carrier, may be drained off through the valve line 51, the carrier thereafter being utilized in the brewing process as a part of the ultimate product.

Another example of the application of the process in the production of a non-alcoholic beverage, such for example as ginger ale, includes the introduction into the retort 20 of an extract base in the nature of ginger roots, the carrier, in this instance being, for example, a water solution of sugar, thereafter introduced through the funneled intake 60, and the digesting process carried out as before with due regard to adequate control of working temperatures and the like necessitated by the particular type of extracts required and the brew which is expected to result. The essences are extracted and reconcentrated as heretofore explained and continually returned into the body of the charge or carrier, in this instance the sugar solution, the latter being drained off for incorporation in the ultimate product, that is, the ginger ale.

It is pointed out that the various steps of the extracting process or method, as well as the form, arrangement, and operation of the various parts of the apparatus specifically described herein for use in conjunction with the process, may be varied without departing from the spirit and scope of the invention as defined hereinafter in the appended claims.

Having thus described my invention, what I claim as new and desire to protect by Letters Patent is:

1. Apparatus of the class described including an upright member comprised of separable upper and lower chamber sections, means for removably securing said upper section atop said lower section, one of said sections having a wall portion common to said sections and dividing the same into upper and lower chambers, said lower chamber constituting a retort and said upper chamber constituting a condenser housing, means for effecting connection with a source of cooling water for circulation through said condenser housing, means providing a condenser chamber in said condenser housing above said common wall and having communication at its lower end through said common wall into said retort, a feed-back pipe connected at one of its ends to an upper portion of said condensing chamber and turned back through said condenser housing and through said common wall portion for communication at its opposite end into said retort, means in said retort for heating a charge therein, means for introducing a charge into said retort, said charge being of a type including liquid constituents and ingredients having volatile essences, said essences being driven off by said heating means for condensation by contact with said common wall portion and with interior portions of said condensing chamber or feed-back pipe depending upon the relative volatility of said essences, all of the essential condensate being returned by gravity directly into the body of said charge, and means for draining said charge from said retort.

2. Apparatus of the class described, including an upright container having a wall portion arranged between its ends so as to provide closed upper and lower chambers, said wall portion being common to said chambers, so as to constitute a top for the bottom chamber and a bottom for the upper chamber, said lower chamber constituting a retort, said lower chamber being constructed and arranged to facilitate introducing a charge therein of a type including liquid constituents and ingredients having volatile essences therein, means for draining said charge from said retort at will, a condensing chamber arranged in said upper chamber and having a throat in its lower region communicating through said common wall into said retort, a feed-back outlet in the upper region of said condensing chamber, a feed-back pipe connected at one end with said feed-back outlet and turned back reentrantly so that its opposite end communicates through said common wall back into said retort, said feed-back pipe being of relatively narrower diameter than said throat, and means for circulating water through said upper chamber in contact with the outermost surfaces of said condensing chamber and feed-back pipe and the upper surface of said common wall portion, and heat exchange means in said retort and arranged to contact said charge for the purpose of heating or cooling the same.

CHARLES G. KUMMERLANDER.